(12) United States Patent
Blakeney et al.

(10) Patent No.: US 6,170,020 B1
(45) Date of Patent: Jan. 2, 2001

(54) RESERVATION AND DYNAMIC ALLOCATION OF RESOURCES FOR SOLE USE OF DOCKING PERIPHERAL DEVICE

(75) Inventors: Stephen R. Blakeney, Longmont, CO (US); Scott L. Pirdy; Robert C. Frame, both of Westboro, MA (US)

(73) Assignee: Compaq Computer Corporation, Houston, TX (US)

(*) Notice: Under 35 U.S.C. 154(b), the term of this patent shall be extended for 0 days.

(21) Appl. No.: 09/107,598

(22) Filed: Jun. 30, 1998

(51) Int. Cl.[7] .................................................. G06F 13/14
(52) U.S. Cl. .......................... 710/10; 710/102; 713/100
(58) Field of Search ................. 710/10, 102; 709/104; 713/100

(56) References Cited

U.S. PATENT DOCUMENTS

| 5,386,567 | * | 1/1995 | Lien et al. ............................ 713/100 |
| 5,768,541 | * | 6/1998 | Pan-Ratzlaff ......................... 710/103 |
| 5,781,798 | * | 7/1998 | Beatty et al. ......................... 710/10 |
| 5,798,951 | * | 8/1998 | Cho et al. ........................ 364/708.1 |
| 5,826,082 | * | 10/1998 | Bishop et al. ....................... 709/104 |
| 5,935,228 | * | 8/1999 | Shinomura ........................... 710/102 |

FOREIGN PATENT DOCUMENTS 54-81049 * 6/1979 (JP).

OTHER PUBLICATIONS

Messmer, Hans–Peter, The Indispensable PC Hardware Book: Your Hardware Questions Answered (Addison–Wesley), table of contents, (1995).
Shanley, T. and Anderson, D., ISA System Architecture (MindShare, Inc.) table of contents (1991, 1993).

* cited by examiner

Primary Examiner—Thomas C. Lee
Assistant Examiner—Albert Wang
(74) Attorney, Agent, or Firm—Hamilton, Brook, Smith & Reynolds, P.C.

(57) ABSTRACT

A computer including a computer housing having a processor and a number of peripheral devices operatively connected to the processor, a docking connector mounted on the computer housing and operatively connected to the processor, a reservation module operative to reserve one of a plurality of resources for use by a peripheral device operatively connected to a docking station that is operatively connectable to the docking connector, and an allocation module responsive to an indication from the reservation module operative to allocate the one of the resources to one of the plurality of peripheral devices.

24 Claims, 4 Drawing Sheets

RESERVATION AND DYNAMIC ALLOCATION OF RESOURCES FOR SOLE USE OF DOCKING PERIPHERAL DEVICE

FIELD OF THE INVENTION

This invention relates generally to the allocation of resources to peripheral devices on computers, such as portable personal computers.

BACKGROUND OF THE INVENTION

Computer systems generally provide different types of resources that it uses to interact with its peripheral devices. Some of the types of resources available include interrupt lines, direct memory access channels, input/output (IO) addresses, and memory addresses. As is well known, interrupt lines allow a peripheral to interrupt the processor, addresses allow the processor to access the peripheral, and DMA channels allow the peripheral to access memory directly.

These resources generally depend on hardware constraints, which tend to be fixed and bear directly on the cost of the computer. For example, building a computer with more interrupt lines may involve adding interrupt controller circuitry and widening the computer's bus, which requires additional circuit board or silicon real estate and a corresponding number of interconnections. And it would typically be very difficult to retrofit additional interrupt lines and controllers to a mass-produced computer.

For these reasons, computer manufacturers generally decide on a fixed set of resources that balances cost and versatility. This can make some configurations impossible and others very tricky, particularly if the computer is well-equipped. For example, a device may be required to act as a slave of another in order to save interrupt lines.

To compound the problem, the semiconductor technology underlying computer systems has evolved dramatically over the past few decades, permitting significant changes in the nature and sophistication of computer architecture. While these advances have greatly enhanced computer performance, maintaining software and peripheral compatibility in the wake of these changes has led in some instances to relatively complex interface issues. The so-called IBM-compatible family of computers and its progeny, for example, have evolved from a fairly simple 8-bit bus structure to a 32-bit bus structure with integrated memory management, multi-tasking support, and various speed enhancements. Along the way, certain early design decisions have led to constraints that need to be followed in order to maintain compatibility with earlier hardware and software. This can require users to shuffle memory addresses, IO addresses, DMA channels, and interrupt request assignments in a sometimes iterative process to achieve a harmonious co-existence of peripheral devices. Juggling these resources to achieve a desired configuration can be difficult and time-consuming, even for some of the most experienced computer users.

SUMMARY OF THE INVENTION

In one general aspect, the invention features a computer including a computer housing having a processor and a number of peripheral devices operatively connected to the processor, a docking connector mounted on the computer housing and operatively connected to the processor, a reservation module operative to reserve one of a plurality of resources for use by a peripheral device operatively connected to a docking station that is operatively connectable to the docking connector, and an allocation module responsive to an indication from the reservation module operative to allocate the one of the resources to one of the plurality of peripheral devices.

The processing module can include a fixed number of interrupt request lines and the resources can be the interrupt lines. The docking station can include a first peripheral connector and the allocation module can be operative to allocate the resource to a first of the peripheral devices connected to the first connector if the first of the peripheral devices is connected to the first connector, and to allocate the resource to a second of the peripheral devices if no peripheral device is connected to the first connector. The allocation module can be operative to deallocate the resource from the second of the peripheral devices if one of the peripheral devices is connected to the first connector while the resource is allocated to the second of the peripheral devices. The allocation module can be operative to deallocate the resource upon detecting a hot undock operation between the computer housing and the docking station. The computer can further include means operative to generate a system-level interrupt upon detecting a hot swap of one of the plurality of peripheral devices and the allocation module can be operative to deallocate the resource in response to the system-level interrupt. The allocation module can be operative to cause another of the peripheral devices to act as a slave to the one of the peripheral devices. The computer can further include means for calling the allocation module on boot-up of the computer. The computer can further include means for calling the allocation module on detecting a hot swap of one of the plurality of peripheral devices. The means for calling can be operative to generate a system management interrupt. The computer can further include a non-volatile volatile resource reservation storage location and the reservation module can be operative to store a resource reservation flag in the non-volatile resource reservation storage location. The reservation module can be operative to prompt a user to determine the desired state of a resource reservation flag.

In another general aspect, the invention features a computer including means for responding to a user reservation command to reserve one of a plurality of resources, and means for leaving the resource unallocated upon detecting the absence of peripheral devices at a first port, and for allocating the resource to the first peripheral device upon detecting the presence of the first peripheral device at the first port.

The computer can further include means for detecting the appearance of the first peripheral at the first peripheral port and the means for leaving and allocating can be responsive to the means for detecting the appearance. The computer can further include means for denying a request for the reserved resource for a second peripheral at a second peripheral port in response to the means for responding. The computer can further include means for reallocating the resource to a second peripheral device upon detecting the arrival of the second peripheral device. The computer can further include means for reallocating the resource to a second peripheral device upon detecting the removal of the first peripheral device.

In another general aspect, the invention features a method of operating a computer. The method includes steps of responding to a user reservation command to reserve one of a plurality of resources, leaving the resource unallocated upon detecting the absence of peripheral devices at a first port, and allocating the resource to the first peripheral device upon detecting the presence of the first peripheral device at the first port.

The method can further include the step of detecting the appearance of the first peripheral at the first peripheral port and the step of allocating can take place in response to the step of detecting the appearance. The method can further include the step of denying a request for the reserved resource for a second peripheral at a second peripheral port after the step of responding. The method can further include the step of reallocating the resource to a second peripheral device upon detecting the arrival of the second peripheral device. The method can further include the step of reallocating the resource to a second peripheral device upon detecting the removal of the first peripheral device.

Systems according to the invention may be advantageous in that they permit the user of a portable computer to easily choose to use the computer with or without some of its peripheral devices, depending on his or her particular needs. This is particularly beneficial when using a docking station with peripheral slots, because the computer can be booted without knowledge of the configuration of the docking station. And these ends may be accomplished with a very simple user interface that does not require the user to understand the relationship between resources in a potentially complicated computer system. The invention can be particularly advantageous when it is applied to a mature computer system that supports multiple bus standards with a number of potentially conflicting compatability criteria.

DETAILED DESCRIPTION OF AN
ILLUSTRATIVE EMBODIMENT

Figure 1:
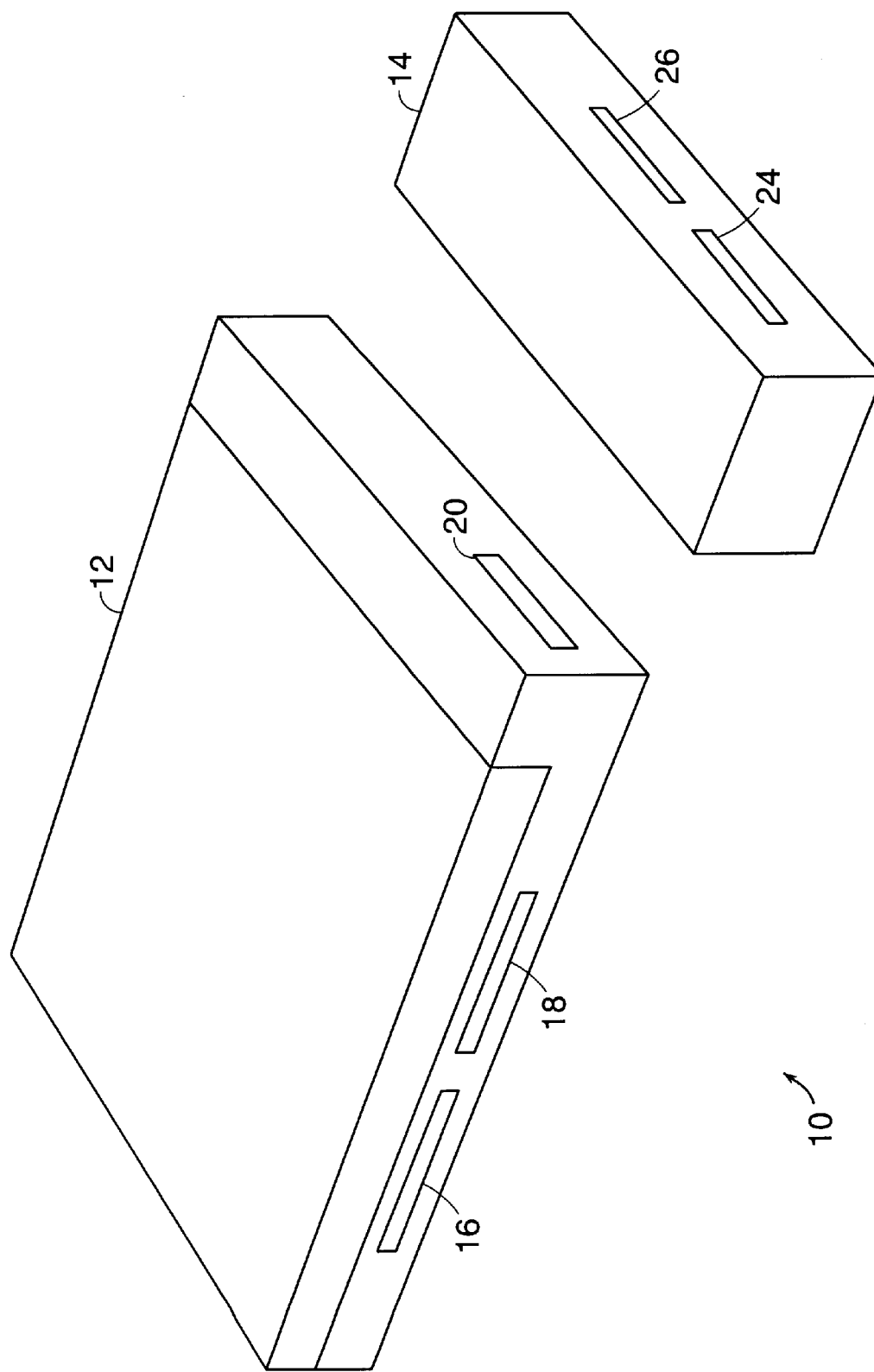
FIG. 1 is a perspective outline drawing of a portable computer according to the invention.

Referring to FIG. 1, a portable computer system 10 according to the invention includes a main computer unit 12 and a docking station 14. The main computer unit is a self-sufficient, battery-powered computer with a processor, memory, and user interface hardware, such as a keyboard, touch pad, and display screen. A docking connector 20 is also located on the main computer unit, and mates with a corresponding docking connector on the docking interface.

The main computer unit 12 has one or more peripheral interface slots 16, 18. Each of these slots includes a connector that allows a peripheral device, such as a floppy disk drive or an IDE device (CD-ROM, hard drive, DVD, etc.) to be inserted and carried with the computer. The slots can be rectangular parallelepiped cavities in the main computer unit's housing, with their connectors being located on an opposite face from an opening in the unit's housing formed by the cavity, such that peripheral devices can slide into a slot and mate with its connector in a single stroke. The docking interface similarly includes one or more peripheral slots 24, 26, which can follow a similar form factor and electrical specification to those in the main computer unit, allowing peripheral devices to be swapped between the slots in the main unit and the slots in the docking station.

Figure 2:
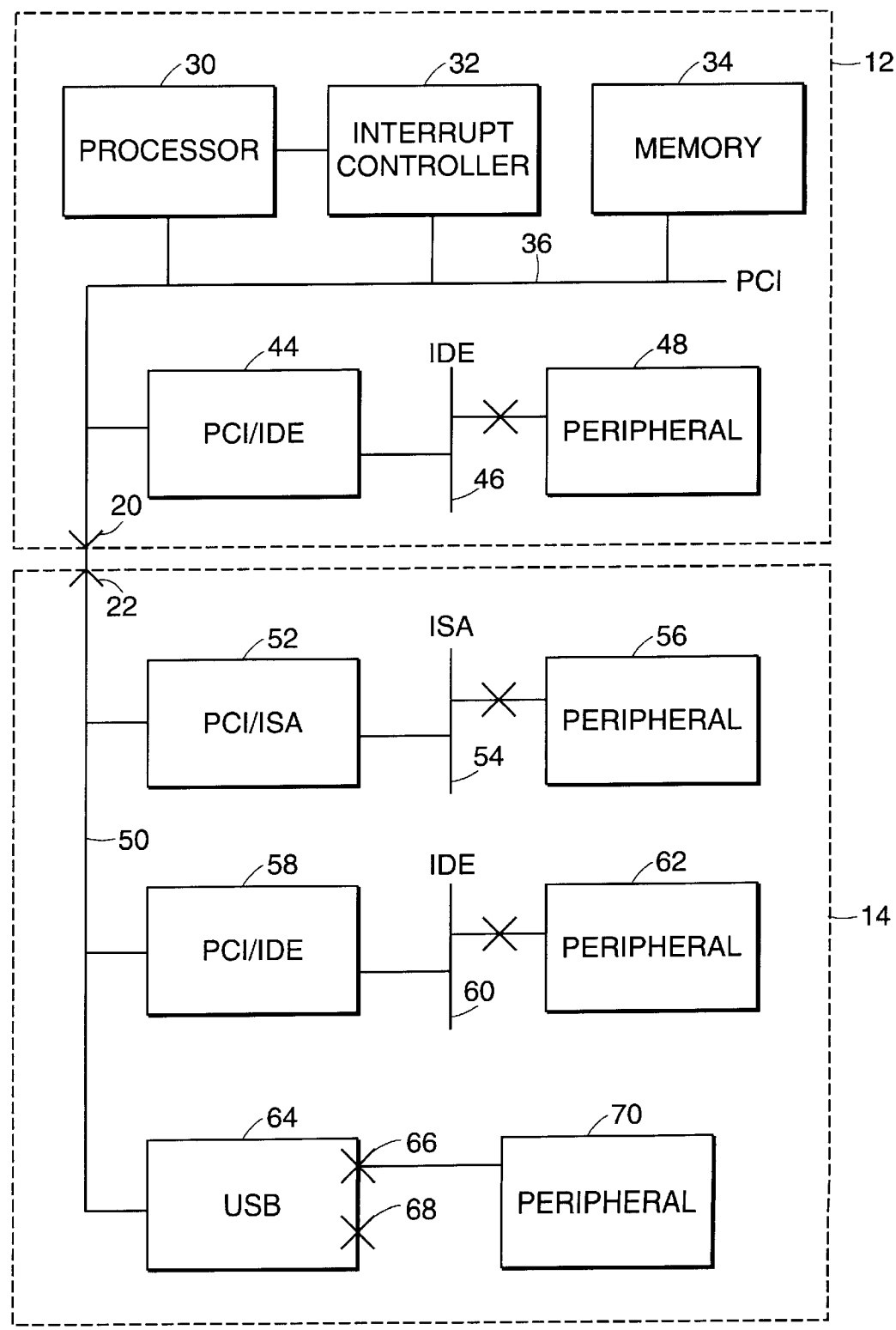
FIG. 2 is a block diagram of relevant portions of the portable computer of FIG. 1.
Figure 3:
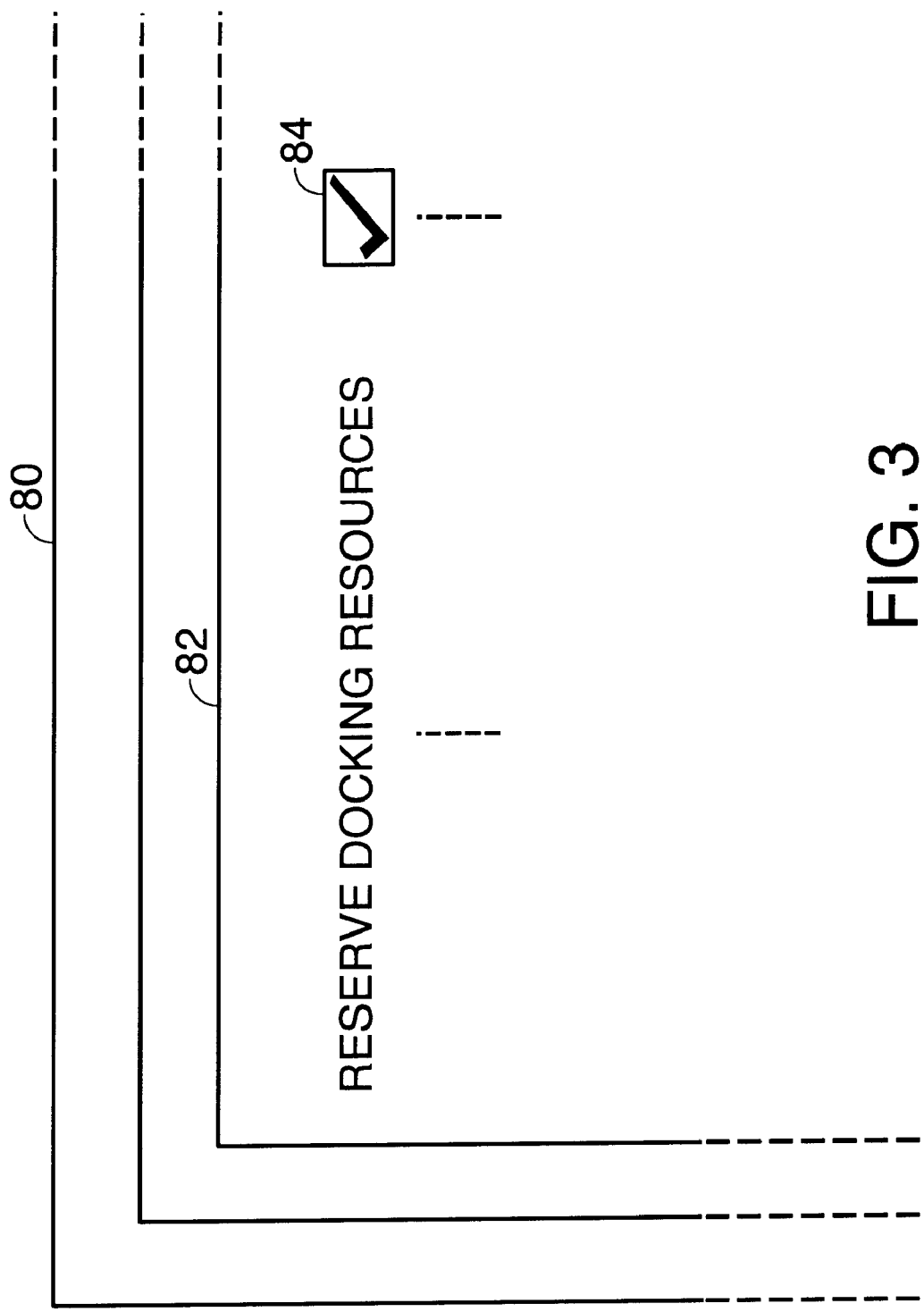
FIG. 3 is a cut-away diagram of a portion of a resource allocation dialog box on the display screen of the computer of FIG. 1.
Figure 4:
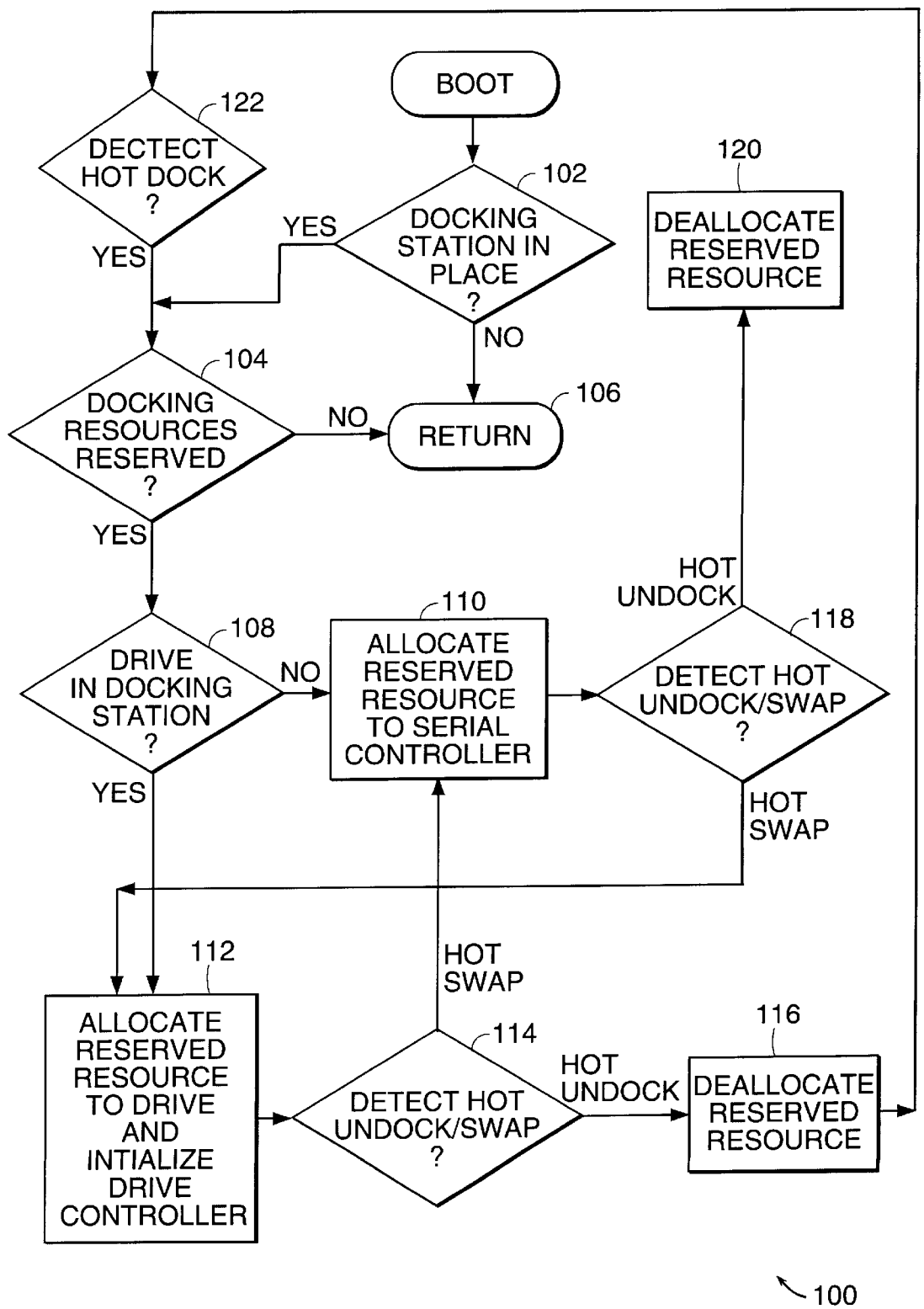
FIG. 4 is a flowchart illustrating the operation of the portable computer of FIG. 1.

Referring also to FIG. 2, the main computer unit 12 includes a processor 30 and memory 34 each having a port operatively connected to a first bus 36. The first bus can be a PCI bus which is a mezzanine bus that has burst transfer and automatic configuration capabilities.

The main computer unit 12 can also include an interrupt controller 32 that has a number of interrupt request line inputs responsive to interrupt request lines on the first bus 36. The interrupt controller also has one or more processor interface lines operatively connected to interrupt lines of the processor 30. In one embodiment, the interrupt controller circuitry follows the architecture of two cascaded Intel 8259A interrupt controllers which together multiplex 16 peripheral interrupt request lines onto a single processor interrupt request line provided to the processor 30. The system can also respond to requests on system management interrupt lines. These are generally a set of higher-priority interrupt lines used for basic system management functions.

A first bus bridge 44 is also operatively connected to the first bus 36 and to a second bus 46. The second bus can be an Integrated Drive Electronics (IDE) interface bus, which is a bus based on the ISA (Industry Standard Architecture) bus designed to handle power and data signal interfaces between a computer and integrated disk controller and drive. This bus can be connected to a peripheral 48, such as a hard drive or a CD-ROM drive.

The first bridge 44 typically requires at least one of the peripheral interrupt request lines and at least one I/O address range so that it can interface efficiently with the processor 30. Further devices and bridges (not shown) can also be provided within the main computer unit, and these devices may also require peripheral interrupt request lines, I/O or memory-mapped address ranges, and/or DMA channels. Two of the devices can be removable peripheral devices inserted in respective ones of the two peripheral interface slots 16, 18.

The first bus 36 within the main computer unit 12 is also operatively connected to the docking connector 20. This docking connector can mate with the second docking connector 22, which is mounted on the housing of the docking station 14. The second docking connector is operatively connected to a first bus 50 within the docking station.

A first bridge 52 is operatively connected to the first bus 50 and to a second bus 54, which is operatively connected to a first peripheral 56, such as a floppy drive. The second bus can be an ISA bus, which is an extension of the IBM-XT bus architecture that operates at 8 MHz and allows for bus mastering. A second bridge 58 is also connected to the first bus 50 of the docking station and to a second bus 60 of the docking station. This second bus can be an IDE bus which can be operatively connected to a second peripheral 62 device, such as a hard drive that is inserted into one of the peripheral interface slots 16, 18 on the docking station 14.

Also connected to the first bus of the docking station is a serial interface adapter 64. This adapter can conform to the Universal Serial Bus ("USB") standard which is a bi-serial transmission standard that permits communication with inexpensive, daisy-chained peripherals. The serial interface can have one or more serial interface connectors 66, 68 to which one or more peripherals 70 can be attached.

In operation, referring to FIGS. 1–4, during initial boot up of the main computer unit 12, the processor 30 will run a boot routine, which is typically stored in a non-volatile portion of the memory 34. One of the functions of the boot routine is to perform hardware configuration, during which the processor allocates resources including I/O addresses, memory addresses, DMA channels and peripheral interrupt request lines to peripheral devices, so that the processor can interact with them. These allocations can be made based on information retrieved from stored configuration files, and/or they can be automatically derived during boot-up (e.g., according to the so-called "Plug and Play" standard).

The boot-up routine will call a resource allocation procedure, which performs resource allocation tasks 100. During boot-up, this procedure begins by determining whether the docking station is in place (step 102). If it is not, control returns to the boot routine (step 106).

The procedure then determines if docking resources have been reserved (step 104). This determination is based on a stored flag, which the user had previously instructed a system configuration preferences program to store. The user will have set this flag by selecting a "Docking Resources Reserved" check box 84 on a system resource allocation dialog box 82 on the screen 80 of the main computer unit 12 in a prior use of the computer. If docking resources have not been reserved, control returns to the boot-up routine.

If docking resources have been reserved, the allocation routine determines whether a drive is present in one of the docking station peripheral slots 24, 26 (step 108). If a drive is found, that routine allocates the reserved resource to the drive and initializes the drive (step 112). If no drive is detected in the docking station, the resource is allocated to the serial controller 64 (step 110).

The resource allocated to either the drive or serial controller can be a peripheral interrupt request line. Because this interrupt request line has been reserved, it will not be used by any devices other than those connected to the docking station, even if it would be beneficial to use it for another peripheral device within the computer. In one embodiment employing an IBM-PC compatible computer, the reserved resource is the lowest priority interrupt line IRQ 15.

After the reserved resource is allocated to either the drive or the serial controller, the boot routine can resume performing its other start-up tasks. Upon completion of these tasks, the user may instruct the processor to interact with the various peripheral devices, including the device on the docking station 14 to which the resource was allocated. This operation can continue until a hot-undock or hot-swap operation is detected (steps 114 or 118). A hot undock operation is the disconnection of the docking station docking connector 22 from the main computer unit docking connector 20 while these components remain in a powered-up state. A hot-swap operation is the removal or reinsertion of one of the peripherals from one of the peripheral slots 24, 26 in the docking station 14.

Hot undock and hot-swap events are directly detected by a control circuitry within the computer that triggers a system management interrupt. This system management interrupt invokes portions of the resource allocation routine to reallocate the reserved resources as necessitated by the hot-dock and hot-swap operations.

When the routine 100 detects a hot-undock routine, it deallocates the reserved resource and leaves it at that state. This resource will therefore not be used by any other peripheral, leaving it ready to be reused by the docking station (steps 116, 120). The user can then transport and use the main computer unit and those peripherals employing resources other than the de-allocated resource.

If the user chooses to reconnect the docking station, a system management interrupt again causes portions of the docking routine to execute on the processor (steps 122 et seq.). As during boot-up, the allocation routine determines whether docking resources are reserved, and allocates the reserved resource either to the drive or to the serial controller. Note that if two drives are present in the docking station 14, they can be configured as master and slave, and thereby share the resource.

When a hot-swap operation is detected on the docking station 14, the allocation routine can reallocate the resources. For example, when removal of the drive is detected, (step 114), the allocation routine allocates the reserve resource to the serial controller (step 112). When the allocation routine detects the insertion of the drive (step 118), the allocation routine allocates the reserved resource to the drive and reinitializes the drive's controller (step 110). Note that in some instances, hot swapping may not be detected. For example, in some systems it may be desirable to keep the reserve resource allocated to the serial port to avoid interruptions in serial communication.

With resources allocated in the manner discussed above, the user can keep one or more devices in the docking station 14 when he or she does not want to carry them around with him or her in the peripheral slots 16, 18 of the main computer unit 12. When he or she needs them, the user can swap the devices into the peripheral slots of the main computer unit, or temporarily dock the main computer unit with the docking station. These options provide a number of different and convenient ways to use the computer in a manner that is straightforward and transparent to the user. The user need only enable a resource reservation flag to cause the computer to operate in this manner.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

What is claimed is:

1. A computer, comprising:
   a main computer unit including a processor and a number of peripheral devices operatively connected to the processor;
   a docking connector mounted on the main computer unit and operatively connected to the processor;
   a reservation module operative to reserve one of a plurality of resources for sole use by a docking station peripheral device operatively connected to a docking station that is operatively connectable to the docking connector; and
   an allocation module responsive to an indication from the reservation module operative to allocate the reserved resource to one of the plurality of docking station peripheral devices.

2. The computer of claim 1 wherein the processing module includes a fixed number of interrupt request lines and wherein the resources are the interrupt lines.

3. The computer of claim 1 wherein the docking station includes a first peripheral connector and wherein the allocation module is operative to allocate the reserved resource to a first of the docking station peripheral devices connected to the first connector if the first of the docking station peripheral devices is connected to the first connector, and to allocate the reserved resource to a second of the docking station peripheral devices if no docking station peripheral device is connected to the first connector.

4. The computer of claim 3 wherein the allocation module is operative to deallocate the reserved resource from the second of the docking station peripheral devices if one of the docking station peripheral devices is connected to the first connector while the reserved resource is allocated to the second of the docking station peripheral devices.

5. The computer of claim 4 wherein the allocation module is operative to deallocate the reserved resource upon detecting a hot undock operation between the main computer unit and the docking station.

6. The computer of claim 5 further including means operative to generate a system-level interrupt upon detecting a hot swap of one of the plurality of docking station peripheral devices and wherein the allocation module is operative to deallocate the reserved resource in response to the system-level interrupt.

7. The computer of claim 1, wherein the allocation module is operative to cause another of the docking station peripheral devices to act as a slave to the one of the docking station peripheral devices.

8. The computer of claim 1 further including means for calling the allocation module on boot-up of the computer.

9. The computer of claim 1 further including means for calling the allocation module on detecting a hot swap of one of the plurality of docking station peripheral devices.

10. The computer of claim 9 wherein the means for calling is operative to generate a system management interrupt.

11. The computer of claim 1 wherein the allocation module is operative to deallocate the reserved resource upon detecting a hot undock operation between the main computer unit and the docking station.

12. The computer of claim 1 further including a non-volatile resource reservation storage location and wherein the reservation module is operative to store a resource reservation flag in the non-volatile resource reservation storage location.

13. The computer of claim 1 wherein the reservation module is operative to prompt a user to determine the desired state of a resource reservation flag.

14. The computer of claim 13 further including a non-volatile resource reservation location and wherein the reservation module is operative to store the resource reservation storage flag in the a non-volatile resource reservation storage location.

15. A computer, comprising:
means for responding to a user reservation command to reserve one of a plurality of resources for sole use by a docking station peripheral device operatively connectable to a first port; and
means for leaving the resource unallocated upon detecting the absence of a docking station peripheral device at the first port, and for allocating the resource to a first peripheral docking station device upon detecting the presence of the first peripheral docking station device operatively connected to the first port.

16. The computer of claim 15 further including means for detecting the appearance of the first docking station peripheral device at the first peripheral port and wherein the means for leaving and allocating is responsive to the means for detecting the appearance.

17. The computer of claim 15 further including means for denying a request for allocation of the reserved resource to a second docking station peripheral device at a second peripheral port in response to the means for detecting.

18. The computer of claim 15 further including means for reallocating the resource to a second docking station peripheral device operatively connected to the first port upon detecting the arrival of the second docking station peripheral device.

19. The computer of claim 15 further including means for reallocating the resource to a second peripheral device operatively connected to the first port upon detecting the removal of the first peripheral device.

20. A method of operating a computer, comprising:
responding to a user reservation command to reserve one of a plurality of resources for sole use by a docking station peripheral device operatively connectable to a first port;
leaving the resource unallocated upon detecting the absence of the docking station peripheral device operatively connected to the first port; and
allocating the resource to the first peripheral device upon detecting the presence of the first peripheral device operatively connected to the first port.

21. The method of claim 20 further including the step of detecting the appearance of a first docking station peripheral device at the first peripheral port and wherein the step of allocating takes place in response to the step of detecting the appearance.

22. The method of claim 20 further including the step of denying a request for allocation of the reserved resource to a second docking station peripheral device at a second peripheral port after the step of detecting.

23. The method of claim 20 further including the step of reallocating the resource to a second peripheral docking station device operatively connected to the first port upon detecting the arrival of the second docking station peripheral device.

24. The method of claim 20 further including the step of reallocating the resource to a second docking station peripheral device operatively connected to the first port upon detecting the removal of the first docking station peripheral device.

* * * * *